US007382256B2

(12) United States Patent
Skjellerup et al.

(10) Patent No.: US 7,382,256 B2
(45) Date of Patent: Jun. 3, 2008

(54) SECURITY SYSTEM FOR PREVENTING UNAUTHORIZED REMOVAL OF MERCHANDISE

(76) Inventors: Johan Skjellerup, P.O. Box 811269, Boca Raton, FL (US) 33481; Eddie L. Stenild, Maglebo 11, DK-2770, Wastrup (DK)

( * ) Notice: Subject to any disclaimer, the term of this patent is extended or adjusted under 35 U.S.C. 154(b) by 176 days.

(21) Appl. No.: 11/056,565

(22) Filed: Feb. 11, 2005

(65) Prior Publication Data

US 2006/0125643 A1 Jun. 15, 2006

Related U.S. Application Data

(63) Continuation-in-part of application No. 11/008,641, filed on Dec. 9, 2004, now abandoned.

(51) Int. Cl.
*G08B 13/14* (2006.01)
*G08B 23/00* (2006.01)
*G06F 17/00* (2006.01)
*G06F 19/00* (2006.01)

(52) U.S. Cl. ................................ 340/572.1; 340/572.8; 340/572.9; 340/568.1; 340/693.5; 235/375; 235/385

(58) Field of Classification Search ..................... None
See application file for complete search history.

(56) References Cited

U.S. PATENT DOCUMENTS 3,974,581 A 8/1976 Martens
4,299,870 A 11/1981 Humble
4,339,853 A 7/1982 Lipschitz
4,523,356 A 6/1985 Charlot, Jr.
4,527,310 A 7/1985 Vandebult
4,590,461 A 5/1986 Cooper
4,603,453 A 8/1986 Yokoyama
4,651,136 A 3/1987 Anderson et al.
4,670,950 A 6/1987 Wisecup et al.
4,685,234 A 8/1987 Anderson et al.
4,774,503 A 9/1988 Bussard
4,884,833 A 12/1989 Pedersen
4,944,075 A 7/1990 Hogan
4,993,245 A 2/1991 Ott
5,031,287 A 7/1991 Charlot, Jr. et al.
5,054,172 A 10/1991 Hogan et al.
5,077,872 A 1/1992 Guthammar
5,088,165 A 2/1992 Minasy et al.
5,151,684 A * 9/1992 Johnsen .................. 340/568.1

(Continued)

FOREIGN PATENT DOCUMENTS

JP 2005-71143 * 3/2005

*Primary Examiner*—Julie Lieu
(74) *Attorney, Agent, or Firm*—Malloy & Malloy, P.A.

(57) ABSTRACT

A security tag assembly and security system associated therewith prevent the unauthorized removal of merchandise from a given area, such as a retail establishment. The security tag assembly comprises a base and at least one attachment member removably connected in an operative position on the merchandise being protected. A locking assembly restricts detachment of the attachment member and is structured to be destructively detached when the base and the attachment member are forcibly separated. A detachment assembly and a data registering processor include a two-way communication link which facilitates processing of the merchandise data disposed on the security tag assembly, such that the purchasing of the merchandise and the removal of the security tag assembly can be effectively accomplished without jeopardizing the security of the merchandise being sold.

21 Claims, 14 Drawing Sheets

U.S. PATENT DOCUMENTS

| | | | | |
|---|---|---|---|---|
| 5,205,024 | A | 4/1993 | Willard | |
| 5,208,580 | A | 5/1993 | Crossfield | |
| 5,347,262 | A | 9/1994 | Thurmond et al. | |
| 5,367,289 | A | 11/1994 | Baro et al. | |
| 5,426,419 | A | 6/1995 | Nguyen et al. | |
| 5,497,639 | A | 3/1996 | Charlot, Jr. | |
| 5,587,703 | A * | 12/1996 | Dumont | 340/568.2 |
| 5,600,977 | A | 2/1997 | Piron | |
| 5,613,384 | A | 3/1997 | Weber et al. | |
| 5,748,089 | A | 5/1998 | Sizemore | |
| 5,912,622 | A | 6/1999 | Endo et al. | |
| 5,942,987 | A * | 8/1999 | Heinrich et al. | 340/10.42 |
| 5,955,951 | A * | 9/1999 | Wischerop et al. | 340/572.8 |
| 6,023,951 | A | 2/2000 | Maurer et al. | |
| 6,089,453 | A * | 7/2000 | Kayser et al. | 235/383 |
| 6,281,800 | B1 | 8/2001 | Sizemore | |
| 6,348,865 | B1 | 2/2002 | Siegel | |
| 6,535,130 | B2 | 3/2003 | Nguyen et al. | |
| 6,722,166 | B2 | 4/2004 | Skjellerup | |
| 6,724,307 | B1 | 4/2004 | Siegel | |
| 6,752,837 | B2 * | 6/2004 | Karp | 340/572.1 |
| D494,488 | S | 8/2004 | Sayegh | |
| 6,774,794 | B2 | 8/2004 | Zimmerman et al. | |
| 7,073,236 | B2 | 7/2006 | Xue et al. | |
| 7,148,805 | B2 | 12/2006 | Hogan | |
| 2002/0105424 | A1 * | 8/2002 | Alicot et al. | 340/572.1 |
| 2003/0067397 | A1 * | 4/2003 | Trimble | 340/825.49 |
| 2004/0016269 | A1 | 1/2004 | Skjellerup | |
| 2004/0231375 | A1 | 11/2004 | Skjellerup | |
| 2004/0233042 | A1 | 11/2004 | Piccoli et al. | |
| 2005/0218218 | A1 * | 10/2005 | Koster | 235/383 |
| 2006/0017574 | A1 | 1/2006 | Skjellerup | |
| 2006/0125643 | A1 | 6/2006 | Skjellerup et al. | |
| 2006/0139176 | A1 | 6/2006 | Skjellerup et al. | |
| 2006/0208908 | A1 | 9/2006 | Skjellerup et al. | |

* cited by examiner

SECURITY SYSTEM FOR PREVENTING UNAUTHORIZED REMOVAL OF MERCHANDISE

CLAIM OF PRIORITY

The present application is a continuation-in-part application of a previously filed, now pending patent application having Ser. No. 11/008,641, filed on Dec. 9, 2004, now abandoned which is incorporated herein in its entirety by reference.

BACKGROUND OF THE INVENTION

1. Field of the Invention

This invention relates to a security system incorporating a security tag assembly comprising a re-useable base and a disposable attachment member collectively and removably securable to various types of merchandise. The base includes a display field having merchandise or like data displayed thereon which may be read and communicated to a check-out type register/processor by a detachment assembly structured to detach the base and attachment member and thereby remove the security tag assembly from the merchandise.

2. Description of the Related Art

Security or anti-theft tags are extensively used in the retail merchandising industry as well as numerous other areas of commerce. In typical fashion, such devices are attached to various types of merchandise in such a manner that that they are clearly obvious by one examining the merchandise. Common knowledge of the use and operation of such devices is believed to prevent or at least restrict the theft or other unauthorized removal of merchandise from the retail outlet or other area being monitored. More specifically, it is believed that such security tag devices serve as a deterrent to unauthorized removal in that a potential thief will recognize that the merchandise will be "stained" or otherwise marked, thereby rendering the merchandise useless, upon forced removal of the security tag. Alternatively the tag may be structured to activate an alarm system as the merchandise, incorporating the tag thereon, passes through a monitoring station typically located at the exits to the retail establishment.

Due to the popularity of security or anti-theft devices of the type described above, numerous attempts have been made to design and structure a device which not only serves as a deterrent against theft, but which includes structural features intended to overcome any attempt to defeat the device which may be applied by an experienced thief. In addition, the structure of such security devices should be such as to be easily secured to and removed from different types of articles such that a device of substantially standard structure can be used to monitor and protect various types of merchandise.

As set forth above known security or anti-theft tags are intended to provide some indication which either renders the merchandise useless or alternatively signals an attempted unauthorized removal. As such, at least one type of indicator is structured to release an ink or colored staining agent upon a forced removal of the security device from the merchandise, such as by rupturing the outer casing or other portions thereof. The released staining agent is difficult, if not impossible, to remove from the protected merchandise thereby clearly indicating that the stained article has been stolen. In addition, such anti-theft devices may include some type of electronic signaling mechanism. This type of device activates an alarm by passing through or in predetermined proximity to a monitoring station, as set forth above. However, because of the large number of practical applications for such security devices, users thereof may request one or more indicator assemblies that have a variety of performance characteristics including, but not limited to, staining, electronic signaling, etc. Also, a retailer may in fact desire more than one type of indicator or different types of "customized" indicator or signaling devices which better protect against the unauthorized removal of merchandise from a given area.

While popular, it is recognized that a significant number of the anti-theft tags currently being utilized include problems or disadvantages which render them less than totally efficient. More specifically, wide spread knowledge of the structural features of such security tags allows unauthorized personnel to develop techniques which are specifically designed to remove the tag from the merchandise in a manner which defeats the aforementioned indicator structures. Therefore it is not uncommon for a skilled or experienced thief to develop tools or techniques to remove the merchandise from the area being monitored without damage to the stolen article or activation of an alarm or monitoring system.

Accordingly there is a recognized need in the security industry for a security system incorporating an anti-theft device preferably in the form of a relatively small security tag assembly which efficiently locks onto various types of merchandise and which is specifically structured to overcome known techniques to remove or otherwise defeat such devices. Moreover, such protective structural features should be compatible with an efficient tag construction and configuration. Therefore, allowing a security tag manufacture or provider to effectively "customize" the indicator assembly to include various "theft indicating" devices, electronic signaling devices or a combination thereof, while not requiring a restructuring or redesign of the entire tag or the remaining, basic operable components associated therewith.

SUMMARY OF THE INVENTION

The present invention is directed to a security tag assembly structured to be connected to different types of merchandise in an operative position. When so connected, the structural and operative components of the security tag assembly prevents or at least restricts the unauthorized removal of the attached merchandise from a given area. The security tag assembly of the present invention is perhaps most commonly, but not exclusively, used and/or identified with retail sales outlets, wherein attempted theft of various merchandise products, commonly termed "shoplifting", is commonplace. In order to prevent such illegal activity, the security tag assembly of the present invention is attachable to the protected merchandise in an efficient manner without causing damage thereto. In addition, the various structural and operative features of the preferred embodiments of the present invention allow the authorized detachment of the security tag assembly from the merchandise in a quick and easy manner and preferably, but not exclusively at the retail outlet site. However, removal of the security tag assembly by unauthorized personnel, such as when the merchandise is being displayed, can not be easily accomplished.

More specifically, the various preferred embodiments of the security tag assembly of the present invention include at least one base and at least one attachment member connectable together in the aforementioned operative position. However, as practically applied a plurality of bases and attachment members are utilized, such as when protecting and/or monitoring a plurality of products and merchandise as is commonly the practice in many retail outlets. As explained in greater detail hereinafter, at least one preferred embodiment of the present invention comprises each of the plurality of attachment members structured to be disposable after use and upon being removed from a corresponding base and the merchandise being protected. A different, unused attachment member then replaces the removed attachment member. In contrast, the one or more bases associated with the security tag assembly of the present invention are structured to include various structural and operative features which enable its reuse, such as including an indicator assembly and being independently connectable to any one of the plurality of attachment members, in an operative position.

The aforementioned operative position may be more specifically defined as the placement of a connector member, fixedly secured to the base and extending outwardly therefrom into interconnecting relation with one of the plurality of attachment members. As such, the connector member preferably includes an elongated pin secured to and extending outwardly from the base. Further, the connector pin may include a sharpened or pointed outermost end to facilitate penetration and/or connection to the merchandise being protected as well as passage into the interior of the corresponding attachment member. Further, when in the operative position the merchandise; depending upon its physical characteristics, will normally be clamped between exterior surfaces of the attachment member and the base. Such clamping engagement of the merchandise is also facilitated by the existence of a seat, for a connected attachment member, disposed on the exterior of the base. The seat preferably has a concave or other preferred configuration which corresponds to the convex or other preferred configuration of the exterior surface of the attachment member.

In order to maintain a secure connection between the base and the attachment member in the operative position and in clamping engagement with the merchandise being protected, each of the plurality of attachment members includes a locking assembly. The locking assembly is disposed on or within the attachment member in receiving relation to the connector member when the attachment member is being disposed in the operative position relative to its interconnection with the base. Further, the locking assembly is structured to permit passage of the connector pin into the attachment member but restrict movement of the connector pin in the opposite position, out of the attachment member. More specifically, the locking assembly of each of the plurality of attachment members is structured to movably engage the connector pin in a manner which permits travel thereof into the interior of the attachment member so as to assume the operative position. However, the structure and disposition of the locking assembly is such as to restrict movement of the connector pin in the opposite direction thereby preventing or restricting separation of the attachment member from the base.

The disposable nature of each of the attachment members is further emphasized by structuring the locking assembly so as to be deformed or destroyed, at least in terms of its originally intended operation, upon a forced removal of the connector pin from its interior interconnection with an attachment assembly. Therefore, the locking assembly of the plurality of attachment members can be described as being “destructively detached” out of movement restricting engagement with the connector pin upon a forced movement or travel of the connector pin out of the attachment member, such as when the attachment member and base are forcibly separated.

Yet another preferred embodiment of the present invention includes the structural feature of a display field located on the base such as, but not limited to, being positioned on an exterior, exposed surface thereof. The display field is disposed and structured to provide ready access to various informative data including merchandise information or the like as well as pricing and/or descriptive information regarding the product or merchandise being protected. Such predetermined data can vary and include, but not be limited to, bar codes or other types of optically scannable indicia, pricing information, color, size, material description and a variety of other information relating to place of origin, manufacture or distribution history of the product or merchandise. Therefore, as set forth above, an embodiment of the base incorporating the display field can be reused for an extended period by attaching it to products or merchandise corresponding to the informative data appearing within the display field. Further, the display field can be defined by printed information and/or removable or fixed labeling disposed in an exposed location for external viewing, scanning, optical reading, etc.

Also, the display field, with the pertinent information appearing thereon, can serve as a time and cost saving feature such as when the security tag assembly is attached to the merchandise at the manufacturing site of the merchandise. By way of example, many clothing products and like merchandise are manufactured in locales where labor costs may be significantly lower than in the geographical location where the merchandise is sold. Accordingly, attachment of the security tag, which has pertinent merchandise data appearing thereon, at the manufacturing site rather than at the retail outlet could result in significant savings in labor costs.

The ability to repetitively and/or continuously reuse the base is further evidenced by the inclusion of an indicator assembly thereon. The indicator assembly may include one or more indicator members at least some of which have the ability to activate an alarm when passing through a security field such as typically found in association with the exits or entrances of various retail establishments. In addition, at least one embodiment of the indicator assembly of the present invention may comprise the indicator member having radio frequency (RF) communication/signaling capabilities. Accordingly, the base is structured to activate a security alarm such as, but not limited to, a proximity alarm of the type typically used to prevent the unauthorized removal of protected merchandise from retail or other facilities, as generally set forth above. Moreover, it is also possible that the RE tag can be adapted to “track” the merchandise to which it is attached, for purposes of inventory, security, logistics, etc.

In order to further enhance the versatility and operative efficiency of the present invention, yet another preferred embodiment thereof is directed to a security system incorporating a security tag assembly of the type described above and further comprising additional operative components and/or accessories. More specifically, the security system of this additional preferred embodiment comprises a detachment assembly and a data registering processor cooperatively structured to establish two-way communication therebetween. Such communication link may be by means of a hard wire connection or alternatively by means of a wireless communication facility which accomplishes the aforementioned two way communication within certain range or distance parameters.

The cooperative communication and structuring of the detachment assembly and the data registering processor facilitates not only the secure protection of various types of products or merchandise but also accomplishes a more efficient performance of the purchase and "check-out" procedures of the merchandize by authorized personnel. As such, the data registering processor can include, but not be limited to, performance parameters which are more commonly associated with a cash register type facility. Moreover, the data registering processor receives communication from the detachment assembly which is representative of the merchandise data appearing on the security tag assembly. When received, the data registering processor serves to process the merchandise data including, but not limited to, the displaying of pertinent information required for purchase and check-out including price, item description, quantity, and/or other pertinent data associated with the product or merchandise being purchased.

Operation of the detachment assembly of this preferred embodiment includes a plurality of operative components associated therewith. Such operative components include a position sensor indicative of orienting the security tag assembly in operative association with the detachment assembly to accomplish detachment thereof out of its operative position relative to the merchandise being protected. The detachment assembly further includes a detachment structure and a holding assembly which cooperate to stabilize the security tag assembly during detachment of the base and attachment member. As a result, the security tag assembly is removed from its operative position on the merchandise being protected.

In addition, a reader assembly is connected to or otherwise associated with the detachment assembly and is considered a part thereof. Disposition and structuring of the reader assembly facilitates a "reading" of the merchandise data appearing on the display field of the security tag assembly. The read or scanned merchandise data will then be communicated by an appropriate communication assembly, also considered a component of the detachment assembly, to the data registering processor to complete the purchase and check-out of the merchandise while effectively maintaining the security thereof.

In addition to the above, the detachment assembly includes an activity display comprising a plurality of visual indicators such as, but not limited to, a plurality of different colored lights. Each of the lights or other visual indicators is structured to currently indicate a different one of a plurality of operative activities of the detachment assembly. Such plurality of operative activities may include engagement and positioning of the holding assembly with the security tag assembly once it is accurately positioned on the detachment assembly. Thereafter, reading of the merchandise data by the reader assembly and communication thereof to the data registering processor will further be indicated. Also, the receipt and processing of the merchandise data by the data registering processor will be sequentially indicated, as will a release of the security tag assembly from the holding assembly and the detachment assembly once the base and attachment member have been separated from their operative position on the merchandise.

Therefore, the various preferred embodiments of the security system and security tag assembly of the present invention overcome many of the problems and disadvantages associated with conventional or previously known security systems and devices and embodies simple and efficient structure, which facilitates the attachment, removal and efficient practice of security as related to the unauthorized removal of the protected merchandise from a given area.

These and other objects, features and advantages of the present invention will become clear when the drawings as well as the detailed description are taken into consideration.

BRIEF DESCRIPTION OF THE DRAWINGS

For a more complete understanding of the nature of the present invention, reference should be had to the following detailed description taken in connection with the accompanying drawings in which.

Like reference numerals refer to like parts throughout the several views of the drawings.

DETAILED DESCRIPTION OF THE PREFERRED EMBODIMENT

Figure 1:
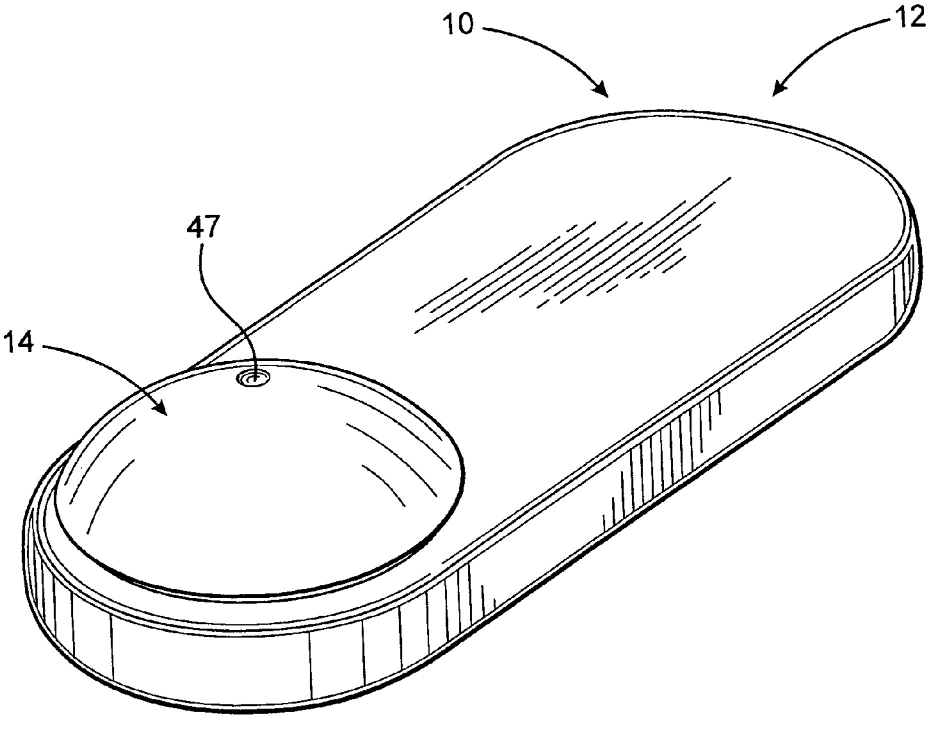
FIG. 1 is a perspective view of one preferred embodiment of the security tag assembly of the present invention.
Figure 3:
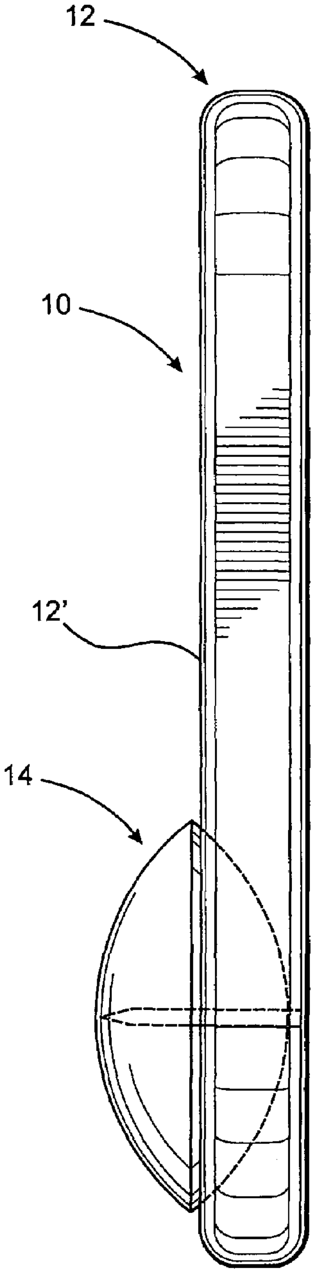
FIG. 3 is a left side view of the embodiment of FIG. 2.
Figure 2:
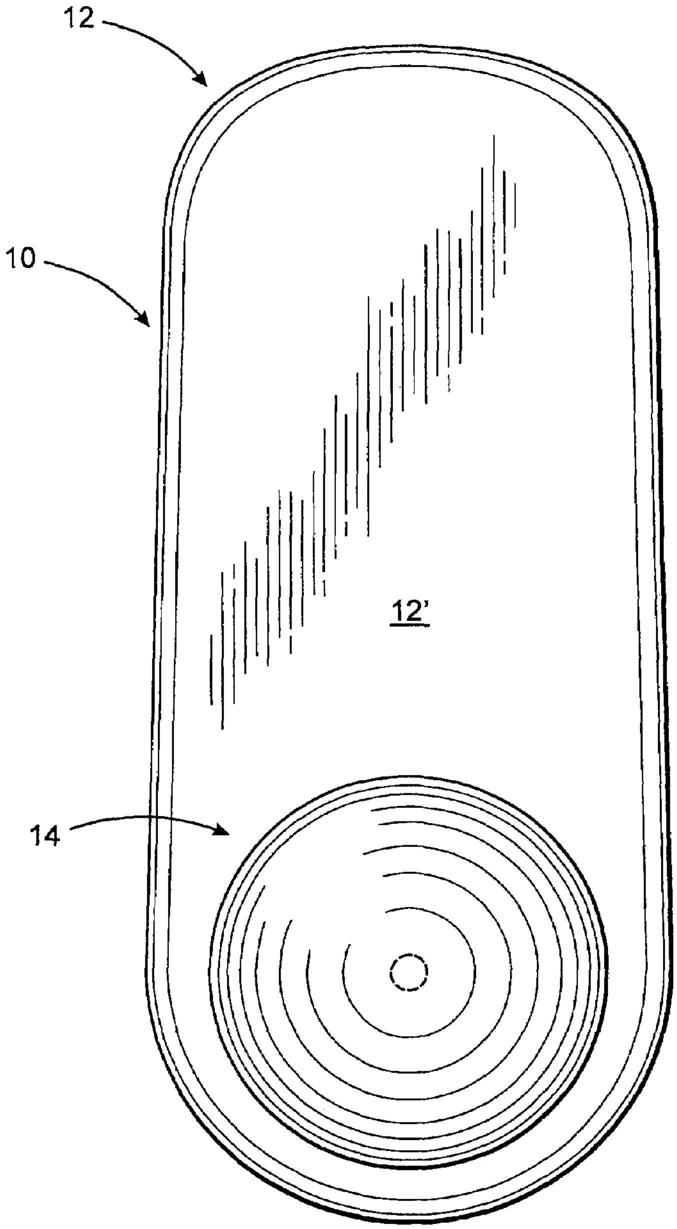
FIG. 2 is a top view of the embodiment of FIG. 1.
Figure 4:
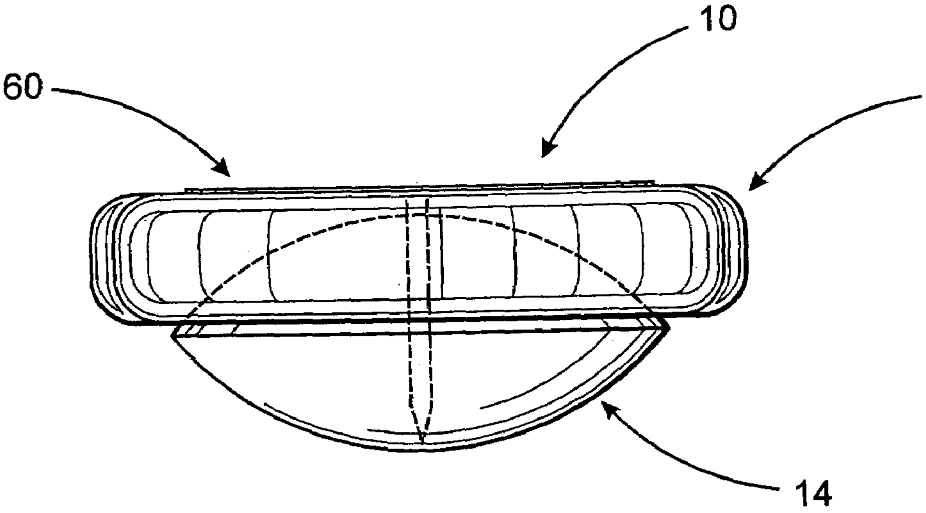
FIG. 4 is an opposite end view of the embodiment of FIG. 2.
Figure 6:
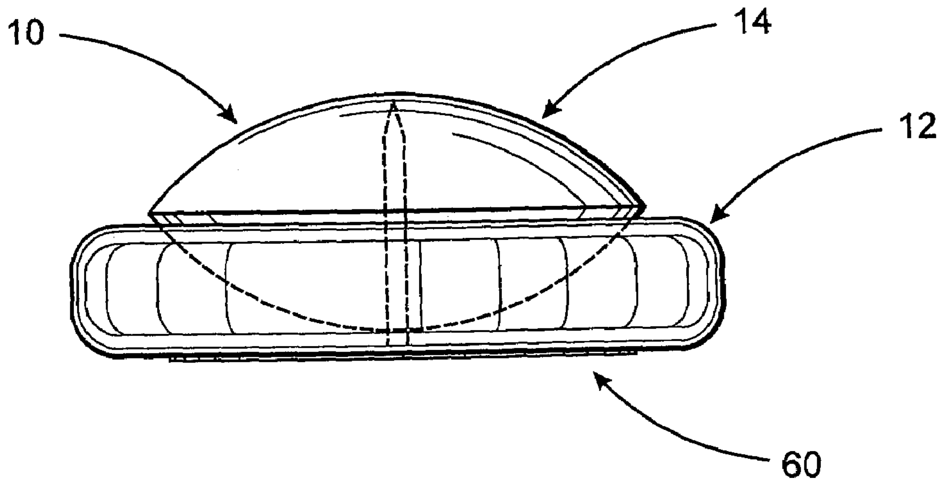
FIG. 6 is an opposite end view of the embodiment of FIG. 2 relative to that of FIG. 4.

As shown in the accompanying drawings, the present invention is directed towards a security tag assembly generally indicated as 10 and comprising at least one base 12 and at least one attachment member 14. However, a practical application of the present invention would typically involve a plurality of bases 12 and a plurality of attachment members 14, such as when a plurality of different products were being protected and/or monitored. Moreover, the security tag assembly 10 is of the type structured to be removably secured to various types of merchandise 18 so as to prevent unauthorized removal of the merchandise 18 from a given area or location. Typical applications for the security tag assembly 10 of the present invention include the interconnecting of one base 12 and any one of a plurality of attachment members 14 to merchandise 18 being protected. As such, removal of the security tag assembly 10 from its operative position can be quickly and easily accomplished by authorized personnel utilizing approved techniques and/or hardware. To the contrary, separation of the base 12 and the attachment member 14 from the operative position and the protected merchandise extremely difficult when attempted by unauthorized personnel.

Further, at least one preferred embodiment of the present invention comprises each of the plurality of attachment members 14 being structured to be disposable after use, subsequent to being removed from a corresponding base 12 and the merchandise being protected. In contrast, the one or more bases 12 of the security tag assembly 10 of the present invention include various structural and operative features which enable their repeated use. Such features include, but are not limited to, an indicator assembly and a connector member which allows any one of the bases 12 to be connected to any one of the "unused" attachment members 14, as will be described in greater detail hereinafter.

More specific structural details of the various preferred embodiments of the present invention include the base 12 having a generally elongated or other appropriate configuration. In addition, maintenance of the merchandise 10 in a clamped orientation between the base 12 and the attachment member 14 is further facilitated by a seat 20 disposed on the base. The seat 20 is preferably configured so as to correspond to the outer surface configuration 14' of the attachment member which is disposed in a substantially seated or aligned received relation within the seat 20. The structures of the preferred embodiments represented in the various figures include the seat 20 include a substantially concave configuration which substantially corresponds to the substantially convex configuration 14' of the attachment member 14. Accordingly, when the base 12 and attachment member 14 are in the aforementioned and preferred operative position, the merchandise 18, depending upon its physical characteristics may be effectively clamped "within" the seat 20 between the base 12 and the outer surface portion 14' of the attachment member 14.

In order to maintain a secure interconnection between the base 12 and the one or more attachment members 14, the base 12 is provided with a connector member generally indicated as 22 comprising an elongated connector pin or like structure 24. The innermost end 26 of the pin is secured to the base 12 preferably, but not necessarily, in cooperation with the seat 20. Moreover, the length of the connector pin 24 is sufficient to extend outwardly from the seat 20 as well as a remainder of the adjacent exterior surface 12' of the base 12 so as to engage and be properly connected to the attachment member 14.

Figure 9A:
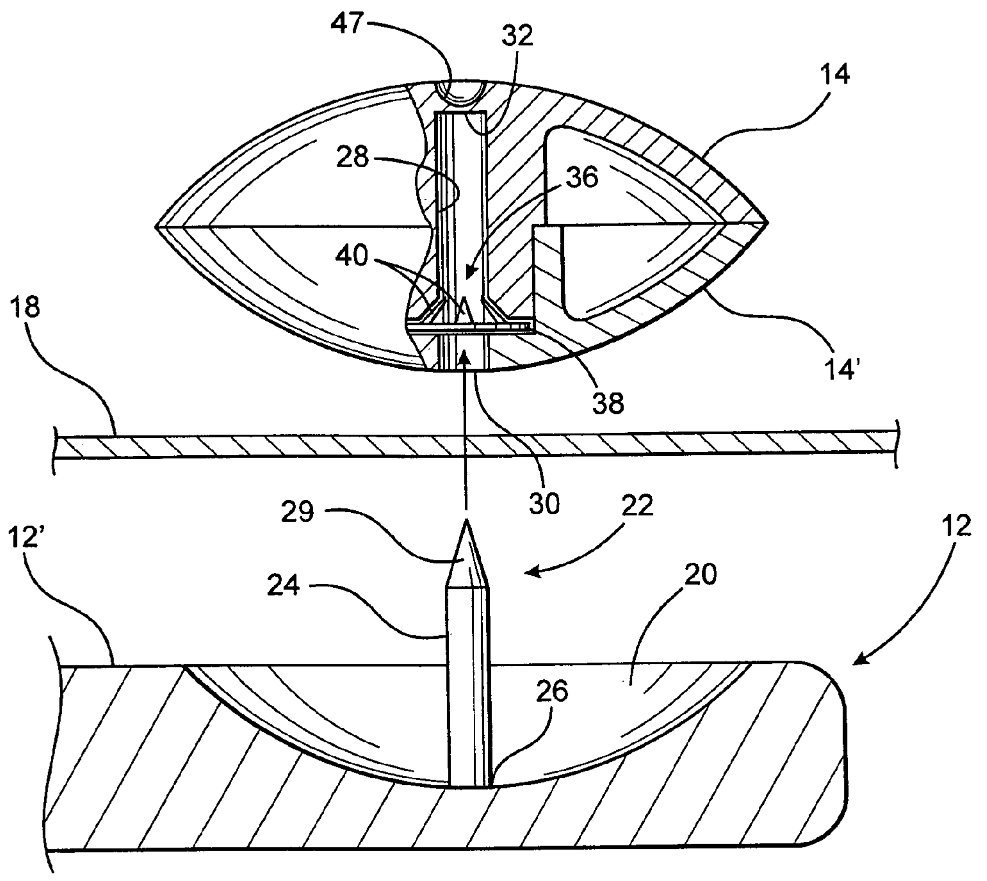
FIG. 9A is an exploded view in partial cutaway and section showing the relative positions of the various operative components for the embodiments of FIGS. 1 through 8 in an unassembled orientation.
Figure 9B:
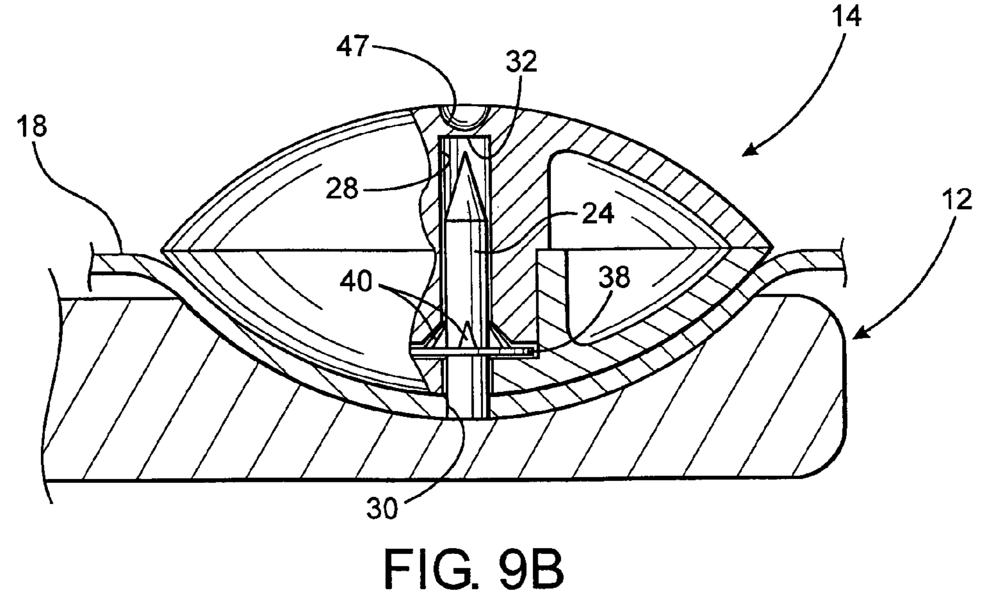
FIG. 9B is a sectional view in partial cutaway of the embodiment of FIG. 9A in an assembled orientation.
Figure 9C:
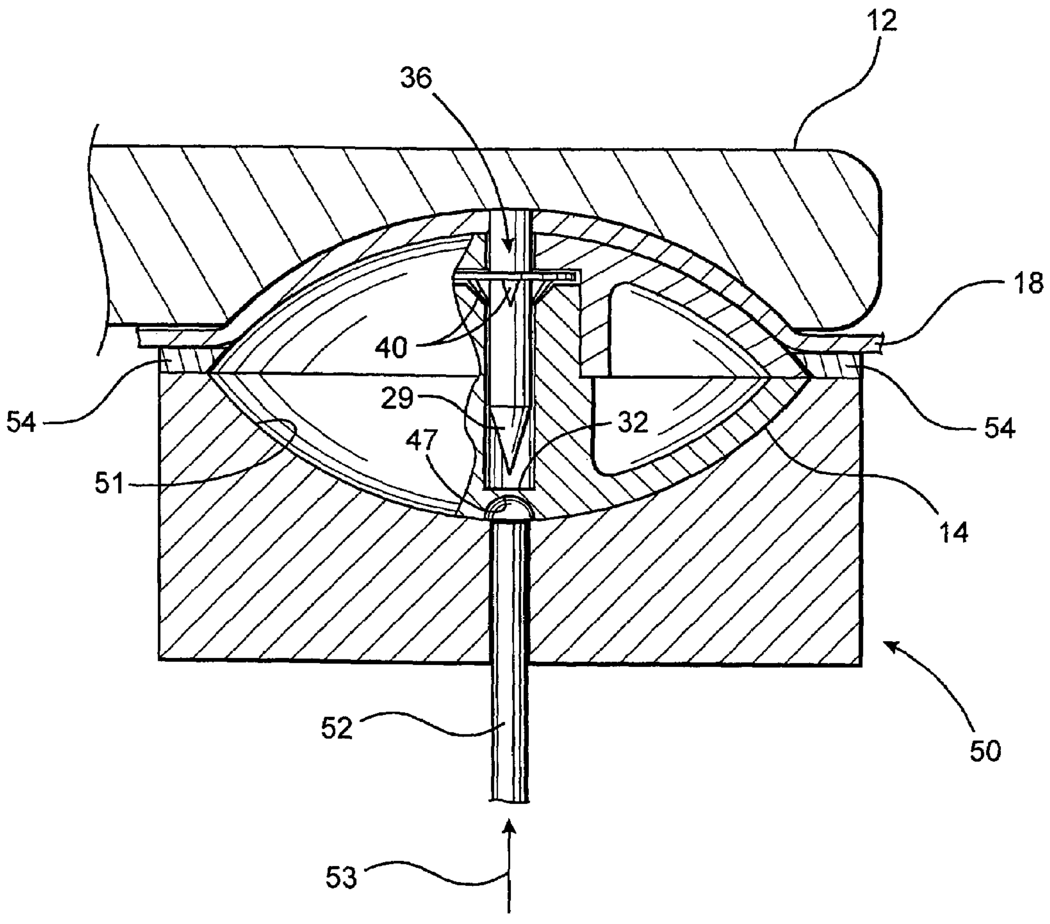
FIG. 9C is a sectional view in partial cutaway representing the beginning of an authorized separation of the operative components of the preferred embodiment of the present invention from the assembled orientation shown in FIG. 9B.

Cooperative structuring of each of the plurality of attachment members 14 includes an elongated passage or channel 28 disposed on the interior of the one or more attachment members 14. Moreover, the channel 28 has a proximal end 30, which is preferably open, as well as a distal end 32. Each of the proximal and distal ends, 30 and 32 respectively, are disposed contiguous with or immediately adjacent to opposed exterior surface portions of the one or more attachment members 14 as clearly demonstrated in FIGS. 9A through 9C. Therefore, the channel 28 extends substantially entirely along a transverse dimension of the attachment member which is at least partially defined by the location of the oppositely disposed proximal and distal ends 30 and 32, respectively. The securing of the attachment member 14 in the preferred, operative position comprises penetration of the merchandise 18 by the connector pin 24 and continued travel of the connector pin 24 through the open proximal end 30 and into the interior of the channel 28 and along a substantial portion of the length thereof. Penetration of the merchandise 18 by the connector pin 24 as well as its passage into the channel 28 may further be facilitated by a pointed or other appropriately shaped tip 29, as demonstrated.

Additional structural features of the various preferred embodiments of the present invention include the provision of a locking assembly generally indicated as 36. The locking assembly 36 is disposed on or preferably within the interior of the attachment member 14 and/or at least in communication with the channel 28 and open end 30 so as to be disposed in receiving relation to the connector pin 24. Therefore, as the connector pin 24 is disposed within the channel 28, it will pass through the open proximal end 30 and be received by the locking assembly 36 as the pin 24 passes there through. One preferred embodiment of the locking assembly 30 comprises a ring 38 disposable in surrounding, concentric relation to the connector pin 24 when it is positioned within the interior of the channel 28 as clearly demonstrated in FIGS. 9B and 9C. In addition, the locking assembly 36 includes a plurality of spaced apart fingers 40 normally disposed in an outwardly angular orientation. As such outer portions of the plurality of fingers 40 movably engage the connector pin 24 when disposed within the channel 28. Further, the structure, configuration, disposition and outwardly angular orientation of each of the plurality of fingers 40 is such as to allow inward travel of the connector pin 20 as it passes into the interior of the attachment member 14 along the channel 28. However, the structure of the plurality of fingers 40 is such as to restrict movement of the connector member 24 in the opposite direction or out of the channel 28, such as when the separation of the attachment member 14 and the base 12 is attempted. The locking assembly 36 can therefore be further described as being disposed and structured to movably engage the connector pin 24 such that it facilitates movement or passage thereof inwardly into the interior of the attachment member 14 along the channel 28. In contrast, the structure and orientation of the plurality of fingers 40 is such as to restrict movement of the connector pin 24 in the opposite direction, out of the channel 28, such as when an attempt to disconnect the base 12 and the attachment member 14 from the intended operative position occurs.

Figure 15:
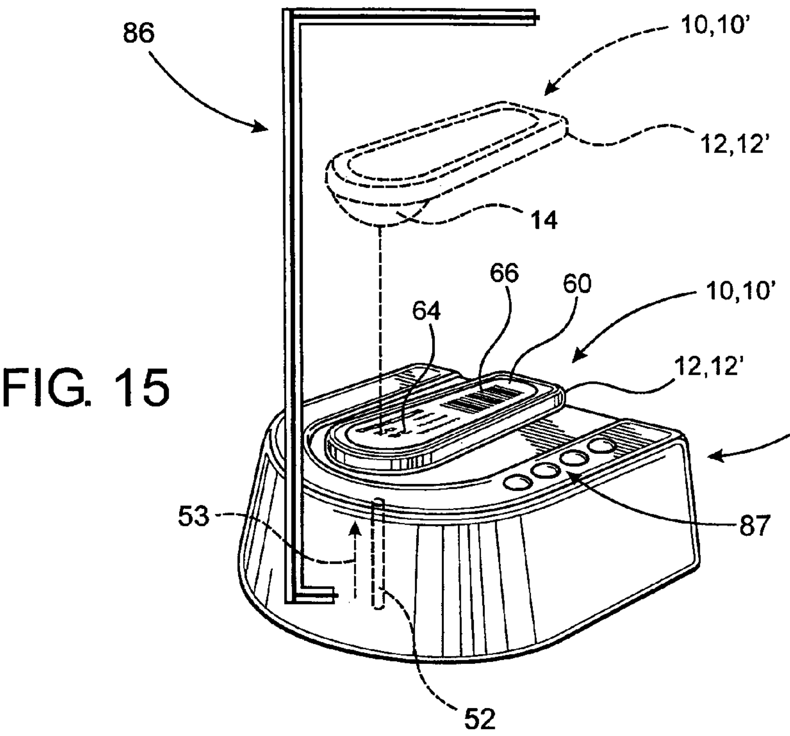
FIG. 15 is a perspective view in schematic form and partial phantom disclosing a preferred embodiment of a security system of the present invention including a structurally modified detachment assembly from that represented in FIG. 10.
Figure 16:
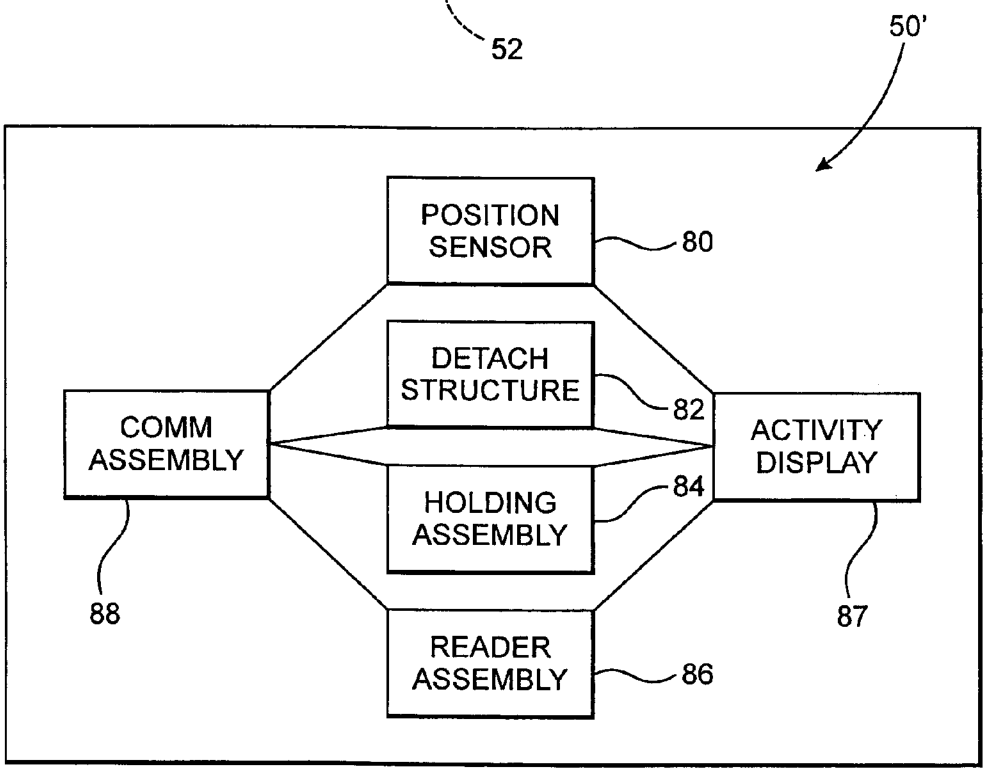
FIG. 16 is a schematic representation in block diagram form of the various operative components of the detachment assembly of the embodiment of FIG. 15.
Figure 17:
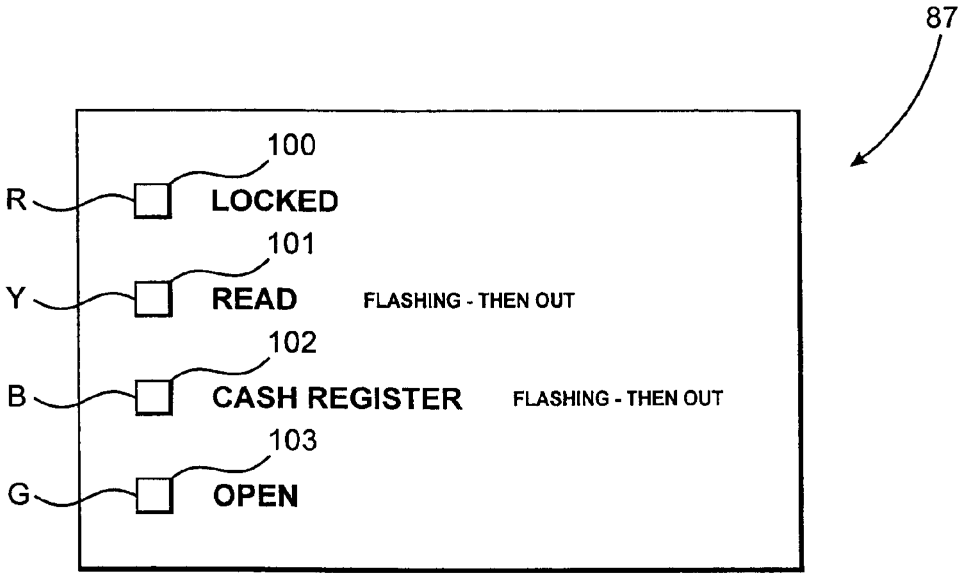
FIG. 17 is a schematic representation in partial block diagram form disclosing details of an activity display assembly associated with the detachment assembly of the embodiment of FIGS. 15 and 16.
Figure 18:
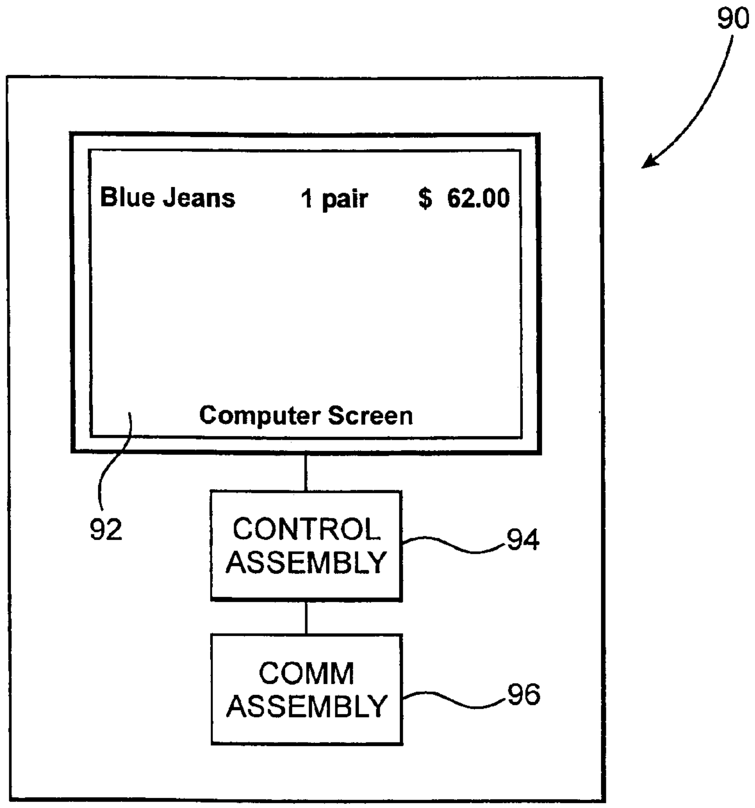
FIG. 18 is a schematic representation of a data registering processor operatively associated with the security system which incorporates the detachment assembly of the embodiment of FIGS. 15 through 17.

As set forth above, one operative feature of the various preferred embodiments of the present invention includes the ability to easily and quickly remove the security tag assembly 10 from the merchandise 18 utilizing authorized personnel, techniques and/or hardware. To the contrary, unauthorized separation of the base 12 and the associated attachment member 14 is rendered extremely difficult when the proper procedures and/or hardware are not utilized. With primary reference to FIGS. 9*c*, 9D and 10, separation of the base 12 and the attachment member 14 from their intended operative position in clamping engagement with the merchandise 18 can be easily accomplished utilizing an approved or authorized detachment assembly, generally indicated as 50. The detachment assembly 50 is intended to be only representative of a variety of different devices and/or hardware which could be applied to the security tag assembly 10 and structured to separate the base 12 from the attachment member 14 and detach the merchandise 18 therefrom without causing damage to the base 12 or merchandise 18. Another preferred embodiment of the detachment assembly 50' is schematically represented in FIGS. 15 and 16, and will be discussed in greater detail hereinafter. Therefore, the detachment assembly 50, as represented in FIG. 10 is not to be considered in a limiting sense since a variety of other structures can be utilized to accomplish authorized separation of the various preferred embodiments of the security tag assembly 10 out of the operative position of FIG. 9B.

Figure 9D:
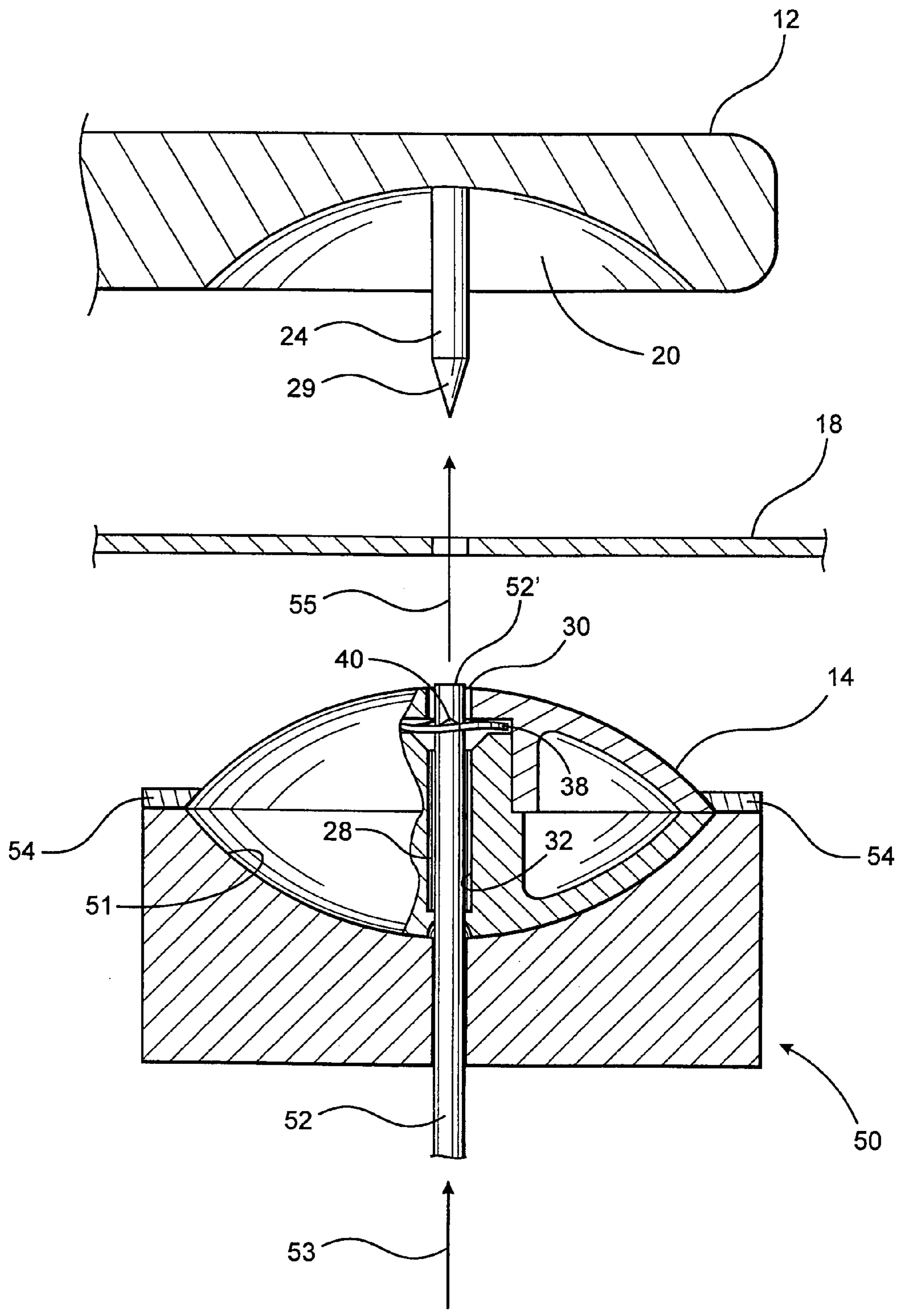
FIG. 9D is an exploded view in cross section and partial cutaway further representing the authorized operation of separating the various components from the position shown in the embodiment of FIG. 9B.
Figure 10:
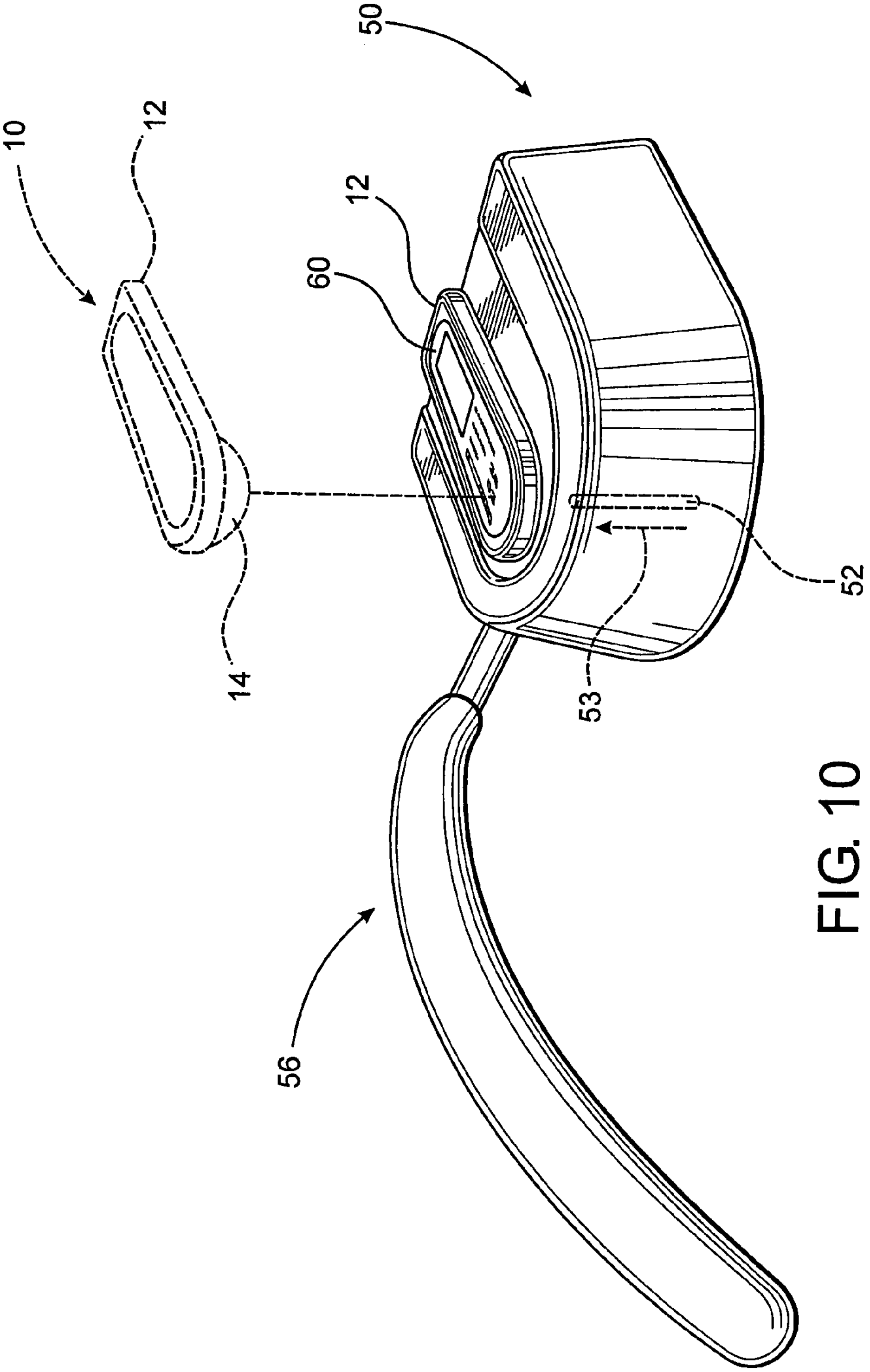
FIG. 10 is a perspective view in exploded form representing a detachment assembly for separating the operative components of the preferred embodiment of the present invention in accord with FIGS. 9C and 9D.

Accordingly, the detachment assembly 50 includes a cavity or like structure 51 (see FIGS. 9C and 9D) for receipt of an attachment member 14 therein when the tag assembly 10 is mounted on the detachment assembly 50 in the orientation disclosed in FIG. 10. In addition, the detachment assembly 50 comprises a drive shaft 52 and a holding or stabilizing structure 54. As also represented in FIG. 10, an actuating handle or like structure generally indicated as 56 is connected by appropriate mechanical linkage to the drive shaft 52. A manipulation of the handle assembly 56 causes a positioning of the stabilizing structure 54 into engagement with corresponding portions of the attachment member 14 and a forced movement of the drive shaft 52 into the interior of the attachment member 14, in accordance with directional arrow 53.

The force of the drive shaft 52 will cause a rupture, displacement, detachment and/or otherwise destructive removal of a cover member or portion 47 which overlies and therefore covers or closes the distal end 32 of the channel 28. The specific structuring of the cover member 47 may vary such as being attached in its intended, overlying position to the channel 28 by a weakened or serrated connecting portion. Alternatively, the material from which the attachment member 14, as well as the cover portion 47 is formed may be such as to yield under the linearly directed force exerted thereon by the drive shaft 52 as it travels into the attachment member 14.

Continued travel of the drive shaft 52 into the interior of the channel 28, through the distal end 32, results in an engagement between the extremity 52' of the drive shaft 52 and outer end portion 29 of the connector pin 24. As such, the continued travel and driving force of the drive shaft 52 will force the connector pin 24 out of the channel 28 and against the movement resisting engagement of the locking assembly 36, including the ring 38 and the plurality of fingers 40 as represented in FIG. 9D. Also, disposition and structure of the locking assembly 36 including, but not limited to, the structure of the plurality of fingers 40 will cause a destruction, or at least partial deformation, of the locking assembly, as represented in FIG. 9D, as the connector pin 24 is forced outwardly from the channel 28 through the open end 30. Accordingly, the locking assembly 36 can be said to be "destructively detached" and/or displaced from a position relative to and engagement with the connector pin 24 as the pin 24 is forced outwardly from the channel 28 in the opposing direction to its direction of entry, as schematically indicated by directional arrow 55.

Once the base 12 and the attachment member 14 are separated from their intended operative position, connector pin 24 may also be easily removed from the merchandise 18. Therefore, the deformation or at least partial destruction of the locking assembly 36 will most probably render the associated attachment member 14 incapable of further use. Therefore, the attachment member 14, once forcibly detached from the connector pin 24, such as in the manner described above, may be considered disposable. In contrast the base 12, as indicated above, can be repeatedly used by having others of a plurality of attachment members 14 independently connected thereto in the aforementioned and preferred operative position.

Figure 7:
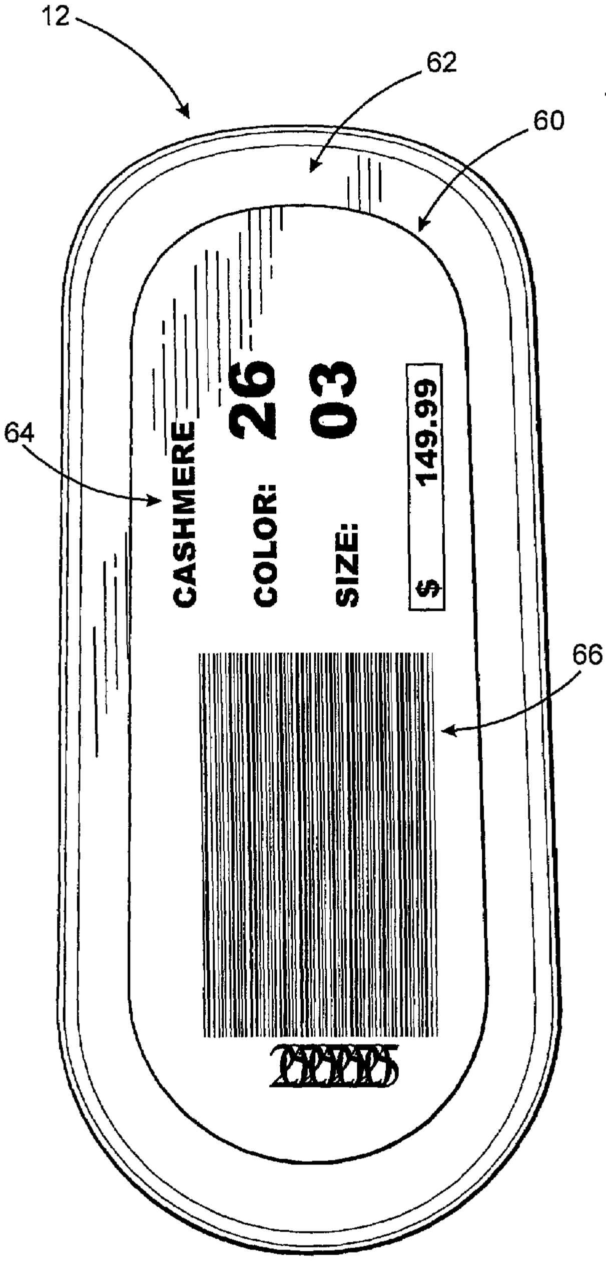
FIG. 7 is a bottom view of the embodiment of FIG. 2.
Figure 5:
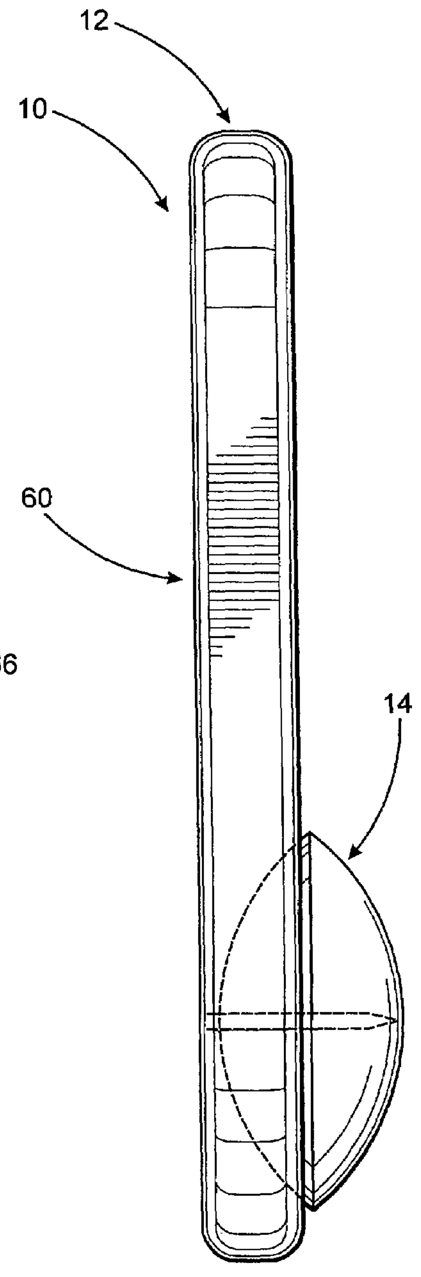
FIG. 5 is a right side view of the embodiment of FIG. 2.
Figure 8:
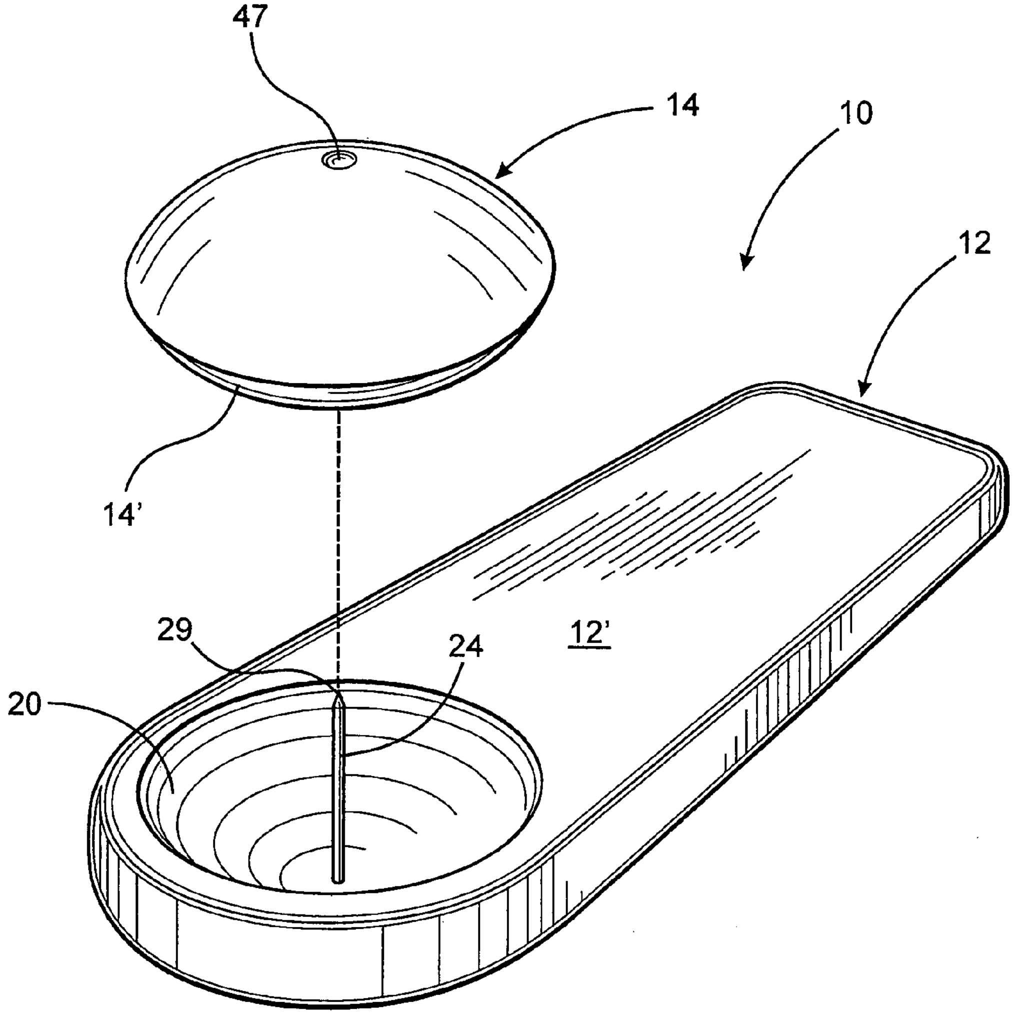
FIG. 8 is a perspective view in exploded form showing a separation of the various operative components of the embodiments of FIGS. 1 through 7.

With primary reference to FIG. 7, yet another structural feature incorporated in at least one preferred embodiment of the present invention is the provision of a display field generally indicated as 60. The display field 60 is formed on any one of a plurality of different exterior surface portions of the base 12 such as on a rear, bottom or undersurface 62. The size and configuration of the display field 60 may vary and is at least partially dependent on the size, dimension and configuration of the base 12 as well as the intended informative data or information, generally indicated as 64, intended to appear thereon. The informative data 64 may include different information sections including a bar code, optical other electrically scanned indicia 66 and/or one or more plurality of printed data sections. The content of the predetermined information and/or data provided for viewing and external exposure would include merchandise information and/or other information regarding the origin, manufacture, distribution history, etc., associated with the merchandise 18 being protected. Other informative data may include physical characteristics of the merchandise or product 18 including size, color, material as well as the pricing thereof. The predetermined data or information, including such information identified as merchandise data is intended to be only representative of a variety of different information and/or data segments or portions which may appear in the display field 60.

Further, the predetermined data or information may be permanently, fixedly and/or removably secured within the display field 60 such as by a labeling and/or by an otherwise fixed and/or secured structuring extending over at least a portion of a corresponding surface 62. Also, the inclusion of the display field 60 can result in time and cost saving features, such as by connecting the security tag assembly 10 at the manufacturing site and thereby "identifying" the merchandise at this point in the product distribution system. By way of example, many products with which the security tag assembly 10 may be used are manufactured in locales having labor costs which are significantly lower than in the geographical location where the products are sold. Therefore, attachment of the security tag assembly 10, having the display field 60 and pertinent data 64 appearing thereon, at the manufacturing site, rather than at the retail outlet, could result in significant savings in labor costs, while assuring that the product is properly marked, described, identified, etc.

Figure 11:
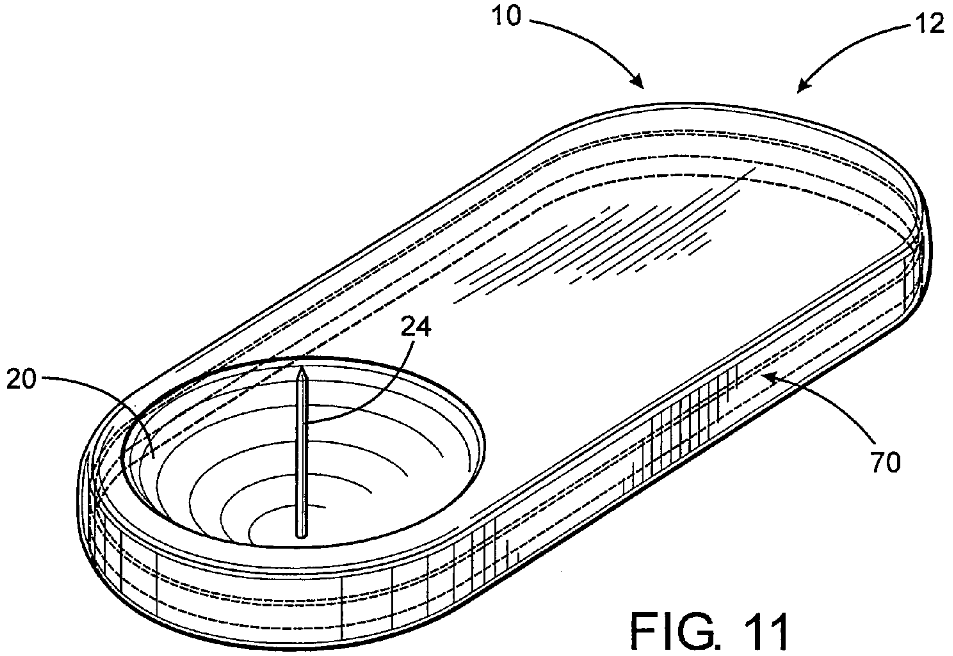
FIG. 11 is a perspective view of yet another preferred embodiment of the present invention incorporating an indicator assembly represented in phantom lines.
Figure 12:
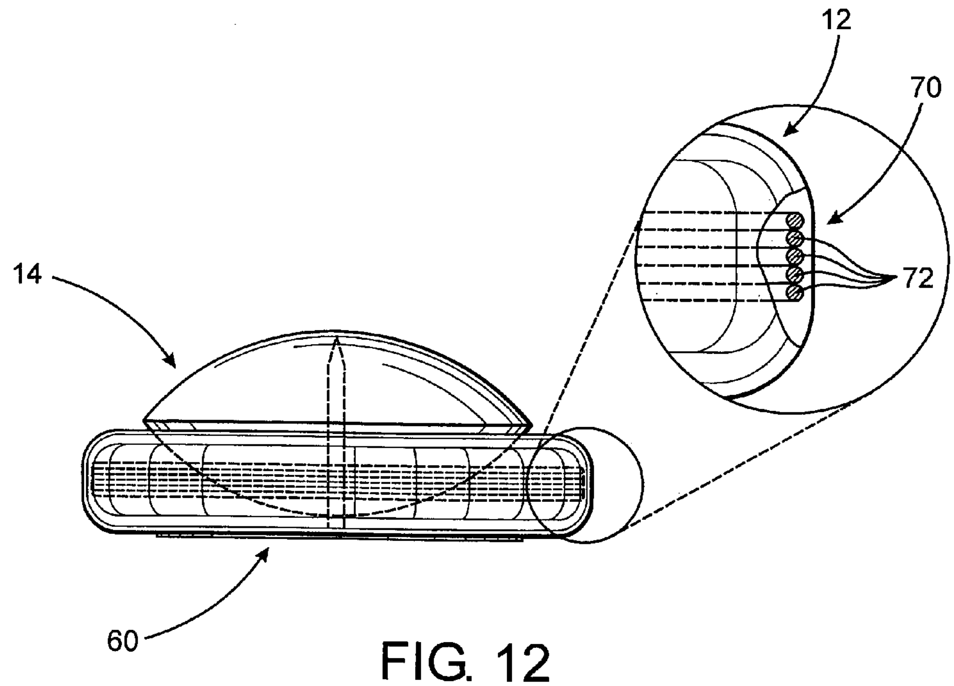
FIG. 12 is a front view and an exploded detail view showing structural details of the embodiment of FIG. 11.

With primary reference to FIGS. 11 and 12, at least one preferred embodiment of the security tag assembly 10 of the present invention comprises an indicator assembly generally indicated as 70. The indicator assembly 70 is mounted and/or connected to the base 12 on at least a portion of the interior thereof as shown in detail in FIG. 12. In a most preferred embodiment of the indicator assembly 70 is formed from a plurality of conductive material coil segments or strands 72. The coil strands 72 may have an at least partially continuous configuration as they are collectively arranged and extend along at least a portion of the periphery of the base 12. As such, the indicator assembly 70 is capable of activating an alarm such as, but not limited to, a proximity alarm of the type typically found and/or associated with entrances and exits of retail establishments. In addition, the indicator assembly 70 comprising the multi-stand construction 72 is structured, configured and disposed to define a radio frequency (RF) coil capable of facilitating RF communication and/or signaling. As such, the RF coil may be modified to demonstrate "tracking" capabilities for the merchandise 18 to which it is attached.

Figure 13:
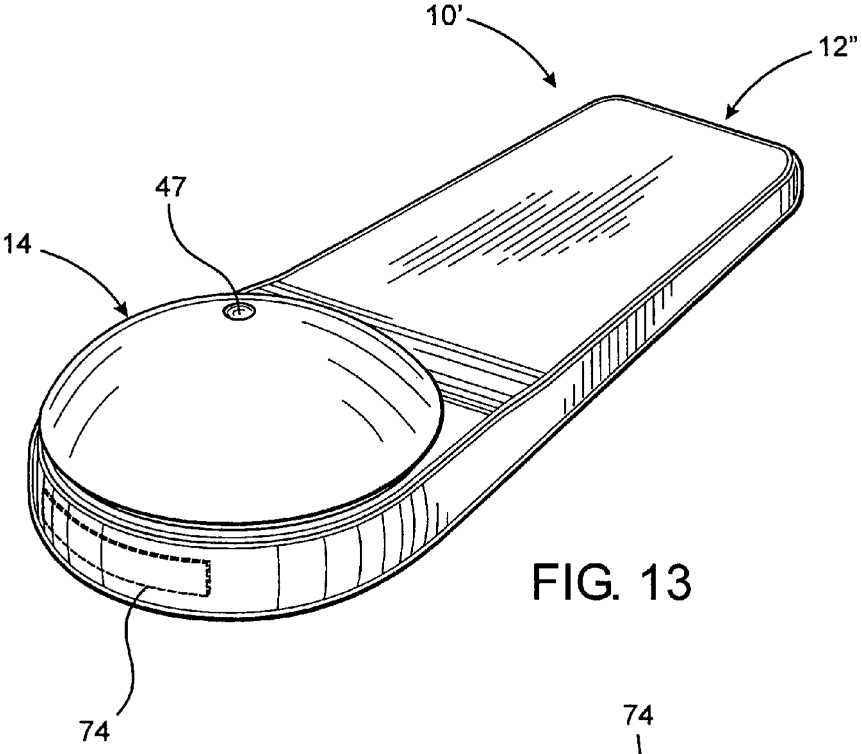
FIG. 13 is a perspective view of yet another preferred embodiment of the present invention shown representing an operative and structural modification from the embodiment of FIGS. 11 and 12.
Figure 14:
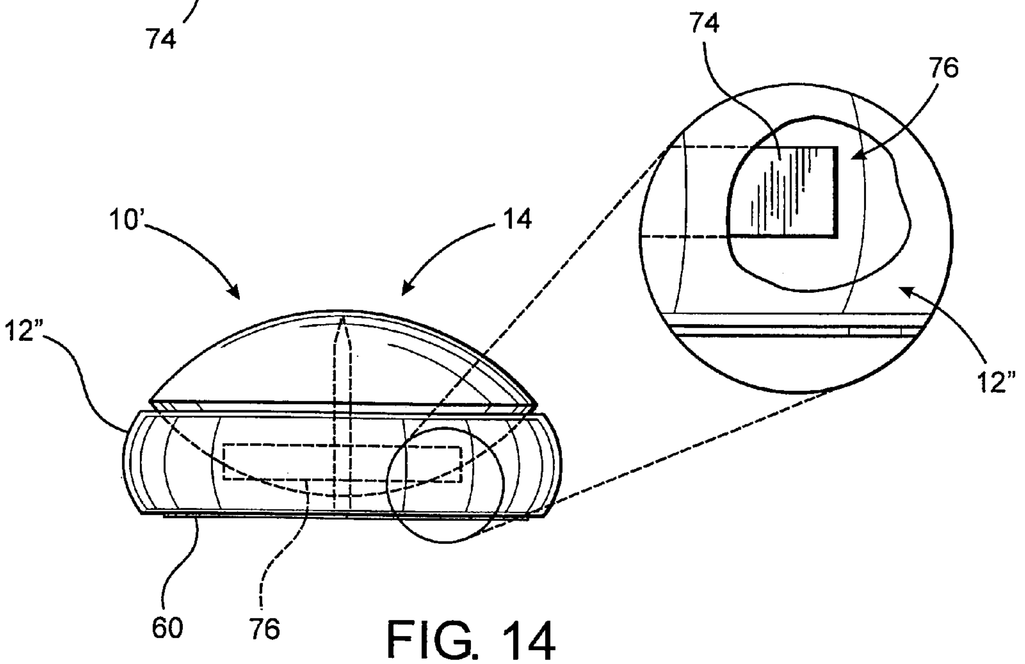
FIG. 14 is a front view and exploded detail view showing structural and operative details of the embodiment of FIG. 13.

Yet another preferred embodiment of the present invention is represented in FIGS. 13 and 14. More specifically, the security tag assembly 10' comprises a base 12" and is structured, similar to the embodiments of FIGS. 1 through 12, to be connected to and used in combination with any one of a plurality of replaceable and disposable attachment members 14. Moreover, various components of the base 12" and the one or more attachment members 14 are equivalently structured to operate in the same manner as described above with specific reference to FIGS. 1 through 12. However, the security tag assembly 10' is distinguishable from the above-noted embodiments through the provision of a base 12" having a varied or modified configuration from that of base 12. More specifically, the base 12" may be somewhat thinner and/or tapered as clearly represented. This alteration in the overall configuration of the base 12" may be at least partially due to the provision of an indicator assembly 74 mounted on and/or connected to the base 12" preferably on the interior thereof in a somewhat hidden location. As such, the indicator assembly 74 includes a conductive or other appropriate material indicator member 76 which is specifically structured, disposed, configured, etc. relative to the structural features of the base 12" to activate an alarm such as, but not limited to, a proximity type of alarm commonly associated with exits and entrances of retail establishments.

In comparing the different preferred embodiments of FIGS. 11, 12 and 13, 14 it is emphasized that the specific structural features in terms of dimensions and configurations may vary from those represented. However, the overall structure of the base 12 and/or 12" should be readily adaptable to the mounting or connection thereto of an indicator assembly 70, 76 and/or a combination of both. Also, while the specific embodiments represented in FIGS. 11 through 14 of an indicator assembly 70 and 76 are specifically disclosed, other indicator assemblies may be provided which include the capability of activating an alarm of the type set forth above.

With primary reference to FIGS. 15 through 19, yet another preferred embodiment of the present invention is directed to a security system incorporating a security tag assembly 10, 10' which includes the structural components of a base 12, 12" and an attachment member 14, as described in detail with reference to the preferred embodiments of FIGS. 1 through 14. As such, the security tag assembly 10, 10' is meant to include the various structural features of the base 12, 12" and the attachment member 14 with reference to the above described preferred embodiments including, but not limited to, the locking assembly 36, the interior channel 38 and the open and closed ends 30 and 32 respectively. Similarly, the additional preferred embodiment of the detachment assembly 50' includes an elongated drive shaft 52 positionable in accord with directional arrow 53 to accomplish forced removal of the connector member 24 from the locking assembly 36 and the interior of the attachment member 14. As a result, detachment between the base 12, 12" and the attachment member 14 will be efficiently accomplished as described above in detail with reference to FIGS. 9A through 9D.

Structural and operative modifications of the preferred embodiment of the detachment assembly 50' include an essentially automatically operating protocol which serves to detach the base 12, 12' from an associated one of the attachment members 14, such that the security tag assembly 10, 10' is no longer in its operative position, being connected to a protected merchandise, product, etc. With primary reference to FIGS. 15 and 16, the detachment assembly 50' includes various operative components which also facilitate the communication of the merchandise data from the display field 60 to the data registering processor 90 (see FIG. 18), for the processing thereof. As described above, the merchandise data may include, but not be limited to, information at least partially relating to the product or merchandise being protected and be in the form of indicia 64, bar code 66 and other display formats. To accomplish its intended purpose, the detachment assembly 50' includes a positioning sensor 80 structured to sense the mounting or connection of the security tag assembly 10, 10' in the intended position of FIG. 15. When so oriented, authorized detachment of the base 12, 12" and the attachment member 14 as well as the attendant removal of the security tag assembly 10, 10' from its operative position on the merchandise being protected, may be efficiently accomplished.

In addition, the detachment assembly includes a detachment structure 82 which includes the drive shaft 52 as well as other structural features described in greater detail with reference to the embodiment of FIGS. 9A through 9*d*. As previously described, forced travel of the drive shaft 52, in accord with directional arrow 53, will cause a forced detachment of the connector member 24 from the interior of the attachment member 14 and disengagement from the locking assembly 36, generally causing its destruction, deformation, etc, as described above. However, rather than being manually operated in the manner described with reference to FIG. 10, drive shaft 52 is automatically operative by other means such as solenoid drive facility or other appropriate driving assemblies capable of accomplishing the forced travel of the drive shaft 52.

The detachment assembly 50' further includes a holding assembly 84 which serves to secure and stabilize the security tag assembly 10, 10' when disposed in the intended position of FIG. 15. When so stabilized, drive shaft 52 can forcibly remove the connector member 24 from its retained position on the interior of the attachment member 14 and out of retaining engagement with the locking assembly 36. Except for automating its activation and operation, the structural details of the holding assembly 84 may be substantially equivalent to the embodiment represented in FIGS. 9A through 9D. Such equivalent features include the holding or stabilizing members 54 engaging an appropriate portion of the attachment member 14.

With further reference to FIGS. 15 and 16, the detachment assembly 50' further includes a reader assembly 86 disposed and structured to clearly observe the display field 60 and various portions of the merchandise data including the indicia 64 and/or the bar code 66. The reader assembly 86 is schematically represented and may be defined by any of a variety of different optical reading and/or scanning facilities capable of the optical reading of the merchandise data 64 and/or 66 and the converting of such data, once optically read or scanned, into a digital or other communicative format. Once so converted, the merchandise data 64 and/or 66 is directed to a communication assembly 88 which is also incorporated within and considered a part of the detachment assembly 50'. The communication assembly 88 may assume a variety of different operative and structural configurations including hard wire connections and/or wireless facilities structured to communicate the merchandise data to the data registering processor 90 generally and schematically indicated in FIG. 18.

The data registering processor 90 is intended to include a variety of performance characteristics capable of processing the merchandise data received from the detachment assembly 50'. By way of example, the data registering processor may serve as a cash register or like "check-out" processor and preferably include a display screen and/or monitor 92 and an operative control assembly 94. Further, the control assembly 94 may include, but is not intended to be limited to, a manual input facility, such as a keyboard assembly, as well as other operative components.

Therefore, it is emphasized that the detachment assembly 50' through the provision of the communication assembly 88 establishes either a hard wire or wireless communication link between it and the data registering processor 90. To accomplish the aforementioned two-way communication, the data registering processor 90 also incorporates a cooperatively functional communication assembly 96. The specific structural and operational features of the communicating assemblies 88 and 96 respectively associated with the detachment assembly 50' and the data registering processor 90 may vary and, as set forth above, may be either hard wired or operative through wireless communication. By way of example, the communication assemblies 88 and 96 could be embodied in appropriately operative devices incorporating nanotechnology, rather than the more conventional hard-wired or wireless transceiver structures described herein. Similarly, the above noted indicator assemblies 70 and 76, rather than assuming the physical characteristics as represented in FIGS. 12 through 14, could comprise communicative and/or signaling devices incorporating nanotechnology. As such, the versatility and effectiveness of the security system, security tag assembly and the various operative components associated therewith may be significantly enhanced Yet additional structural and operative features of the detachment assembly 50' include an activity display 87 which preferably comprises a plurality of visual indicators 100 through 103 which may be in the form of different colored lights or other appropriate visual indicators. The activity display 87 is disposed and structured to indicate the current operative activity of the detachment assembly 50', wherein each of the indicators 100 through 103 is structured and disposed to indicate a different one of a plurality of operative activities of the detachment assembly 50'. As will be described in greater detail with primary reference to FIG. 18, the plurality of operative activities at least comprise engagement of the holding assembly 84 with the security tag assembly 10, 10'; the reading of the merchandise data 64 and/or 66 from the display field 60 by the reader assembly 86; the communication of the optically read merchandise data 64 and/or 66 from the detachment assembly 50' to the data registering processor 90 through operation of the respective communicating assemblies 88 and 96; the receipt and processing of the merchandise data by the data registering processor 90 and the release of the security tag assembly 10, 10' by means of separating the base 12, 12" from the attachment member 14 substantially concurrent with the removal of the security tag assembly 10, 10' from the detachment assembly 50'.

Figure 19:
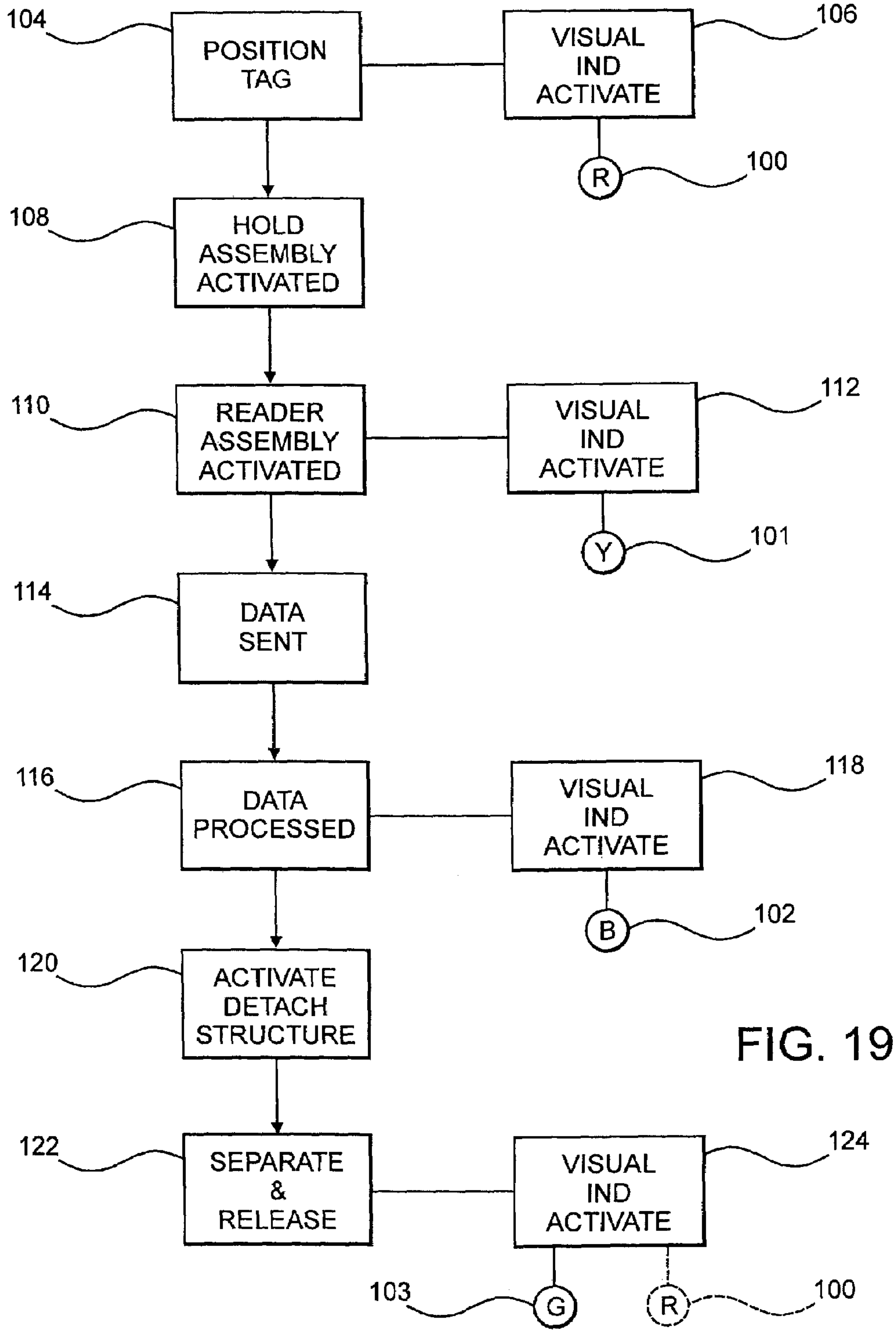
FIG. 19 is a schematic representation in block diagram form of the operation and practice of the security system of the present invention.

Therefore, the practice and operation of the security system embodiment represented in FIGS. 15 through 18 is schematically represented in FIG. 19. More specifically, when a product or merchandise is being purchased it is of course necessary to remove the security tag assembly 10, 10'. Accordingly, authorized removal of the security tag assembly 10, 10' comprises its positioning or orientation in association with the detachment assembly 50', as at 104. When such occurs, the positioning sensor assembly 80 will sense the presence of the security tag assembly 10, 10' which is being detached from its operative position on the merchandise being protected. Concurrently, at least one of the plurality of visual indicators 100 of the activity display 87 will be activated as at 106. For purposes of clarity, the plurality of visual indicators 100 through 103 are represented as lights, LED's, etc. of different colors wherein the designations R, Y, B and G are respectively indicative of the red, yellow, blue and green coloring of the lights or other visual indicators 100 through 103.

When the security tag assembly 10, 10' is properly positioned relative to the detachment assembly 50', the holding assembly 84 is activated, as at 108, such as by interaction with the position sensor 80, to the extent that the holding or stabilizing members 54 appropriately engage the security tag assembly 10, 10' in the manner represented in FIG. 9D and described above. The security tag assembly 10, 10' is thereby properly stabilized and firmly but removably secured in its intended orientation relative to the detachment assembly 50'. Further, this stabilized securement allows a detachment of the base 12, 12" and the associated attachment member 14 through forced travel of the drive shaft 52 in the direction indicated by directional arrow 53. (See FIGS. 9D and 15). However, as will be indicated hereinafter, the detachment of the base 12, 12" and attachment member 14 will be delayed until the processing of the merchandise data and purchase of the protected merchandise has been otherwise completed.

Upon the proper orientation or positioning of the security tag assembly 10, 10' relative to the detachment assembly 50' the reader assembly 86 is automatically activated, as at 110. The activation and operational activity of the reader assembly 86 is indicated by activation of the visual indicator 112 comprising an illumination of the visual indicating light 101, which may be yellow or any other appropriate color. Upon being optically read, the merchandise data is then communicated, as at 114, to the data registering processor 90 where the merchandise data is processed, as at 116. As described above, the data registering processor 90 comprises the display 92 wherein at least a portion of the merchandise data may be displayed on the screen or monitor 92. In addition, further manual or automatic input may be accomplished by means of the control assembly 94. Accordingly, it should be apparent that the data registering processor 90 may serve as a cash register type facility and include the various operational and processing steps eventually associated therewith. Such steps include but are not limited to display of the indicated price, quantity, etc, of the merchandise and the presentation of a hard copy receipt as well as the indication and logging of acceptable payment received for purchase of the merchandise. Concurrently, one of the plurality of visual indicators 102, schematically represented as a blue light or like structure, is activated as at 118. As such, the user of the detachment assembly 50' is informed of this operational activity being currently performed by the detachment assembly 50'.

Upon completion of the purchasing procedure and other merchandise data processing 116, an intended operational or activating signal, as at 120, is communicated from the data registering processor 90 to the detachment structure 82 associated with the detachment assembly 50'. As set forth above, the detachment structure 82 comprises the drive shaft 52 being forced into the interior of the attachment member 14 causing removal of the connector member 24 therefrom and disengaging the connector member 24 from the locking assembly 36 causing the latter to destruct. This results in the base 12, 12" and the attachment member 14 being detached from one another and a separation of the security tag assembly 10, 10' from its operative position of being connected to the merchandise being protected.

Finally, as the base 12, 12" and the attachment member 14 are detached from one another, the attachment member 14 is released from the stabilized and secured engagement with the holding assembly 84, as at 122. This is automatically accomplished by an activating signal being sent to the holding assembly 84 upon a completion of the processing of the merchandise data 64, 66. Concurrently, a visual indicator such as a green or other colored light 103 is activated, as at 124, providing a clear indication of the operational activity being currently performed by the detachment assembly 50'. In at least one additional modification and/or preferred embodiment of the detachment assembly 50', the visual indicator 100, which may be defined by a red or other colored light, may remain illuminated during the entire procedure. However, upon illumination of the green indicator light 103, the red indicator light 100 may be extinguished as the security tag assembly 10, 10' or any portion thereof is removed from the detachment assembly 50' as indicated in phantom lines in FIG. 15.

Since many modifications, variations and changes in detail can be made to the described preferred embodiment of the invention, it is intended that all matters in the foregoing description and shown in the accompanying drawings be interpreted as illustrative and not in a limiting sense. Thus, the scope of the invention should be determined by the appended claims and their legal equivalents.

Now that the invention has been described,

What is claimed is:

1. A security system for discouraging unauthorized removal of merchandise from a given area, said security system comprising:

a security tag assembly comprising at least one attachment member and a base collectively disposable in an operative position relative to the merchandise, a display field disposed in an exposed position on said security tag assembly and comprising at least merchandise data disposed thereon, a detachment assembly removably connectable to said security tag assembly and structured to detach said base and said attachment assembly out of said operative position, a data registering processor cooperatively structured with said detachment assembly to establish two way communication therebetween, said data registering processor further structured to process said merchandise data received from said detachment assembly and facilitate activation of said detachment assembly for disposition of said security assembly out of said operative position, said detachment assembly comprising a reader assembly structured to read said merchandise data and facilitate communication thereof to said data registering processor, and said reader assembly is mounted relative to said detacher assembly disposed and structured to observe said display field of when said security tag assembly that is accurately oriented relative to said detachment assembly.

2. A security system as recited in claim 1 wherein said detachment assembly comprises a holding assembly structured to stabilize said security tag assembly relative to said detachment assembly at least during detachment of said base and said attachment member.

3. A security system as recited in claim 2 wherein said holding assembly is in communication with said data registering processor and being activated into a release position by said data registering processor.

4. A security system as recited in claim 1 further comprising a locking assembly mounted on said attachment member and disposed and structured to engage a connector member secured to said base when said security tag assembly is in said operative position.

5. A security system as recited in claim 4 further comprising said connector member secured to and extending outwardly from said base and disposed and dimensioned to pass into an interior of said attachment member into movement restricting engagement with said locking assembly when said base and said attachment member are in said operative position.

6. A security system as recited in claim 5 wherein said locking assembly is disposed within an interior of said attachment member and in surrounding, movement restricting relation to said connector member when said attachment member and said base are in said operative position.

7. A security system as recited in claim 6 wherein said locking assembly is destructively detached out of movement restricting engagement with said connector member upon forced travel of said connector member out of said attachment member.

8. A security system as recited in claim 7 further comprising a plurality of attachment members each independently connectable to said base in said operative position.

9. A security system as recited in claim 8 wherein each of said plurality of attachment members are destructively removable from said base and are subsequently disposable.

10. A security system for discouraging unauthorized removal of merchandise from a given area, said security system comprising:

a security tag assembly comprising at least one attachment member end a base collectively disposable in an operative position relative to the merchandise, a display field disposed in an exposed position on said security tag assembly and comprising at least merchandise data disposed thereon, a detachment assembly removably connectable to said security tag assembly and structured to detach said base and said attachment assembly out of said operative position, a data registering processor cooperatively structured with said detachment assembly to establish two way communication therebetween, said data registering processor further structured to process said merchandise data received from said detachment assembly and facilitate activation of said detachment assembly for disposition of said security assembly out of said operative position, said detachment assembly comprising a reader assembly structured to read said merchandise data and facilitate communication thereof to said data registering processor, and said detachment assembly further comprising a holding assembly structured to stabilize said security tag assembly relative to said detachment assembly to facilitate detachment of said base and said attachment member; and wherein said detachment assembly further comprises an activity display connected thereto and structured to indicate current operative activity of said detachment assembly.

11. A security system as recited in claim 10 wherein said holding assembly is communicative with said data registering processor and is signally activated into a release position by said data registering processor.

12. A security system as recited in claim 10 wherein said activity display comprises a plurality of visual indicators each structured and disposed to indicate a different one of a plurality of operative activities of said detachment assembly.

13. A security system as recited in claim 12 wherein said plurality of operative activities at least comprise engagement of said holding assembly with said security tag assembly; reading of said merchandise data by said reader assembly and communication of said merchandise data to said data registering processor; receipt and processing of said merchandise data by said data registering processor and release of said security tag assembly by said holding assembly.

14. A security system for discouraging unauthorized removal of merchandise from a given area, said security system comprising:

a security tag assembly comprising at least one attachment member and a base collectively disposable in an operative position relative to the merchandise, a display field disposed in an exposed position on said security tag assembly and comprising at least merchandise data disposed thereon, a detachment assembly removably connectable to said security tag assembly and structured to detach said base and said attachment assembly out of said operative position, said detachment assembly further comprising an activity display connected thereto and structured to indicate plurality of operative activities of said detachment assembly, a data registering processor cooperatively structured with said detachment assembly to establish two way communication therebetween, and said data registering processor further structured to process said merchandise data received from said detachment assembly and facilitate activation of said detachment assembly for disposition of said security assembly out of said operative position.

15. A security system as recited in claim 14 wherein said activity, display comprises a plurality of visual indicators each structured and disposed to indicate a different one of said plurality of operative activities of said detachment assembly.

16. A security system for discouraging unauthorized removal of merchandise from a given area, said security system comprising:

a security tag assembly comprising at least one base and a plurality of disposable attachment members each independently connectable to said base in an operative position, a connector member secured to said base and disposed and structured to engage the merchandise and interconnect any one of said plurality of attachment members to said base in said operative position, each of said plurality of attachment members including a locking assembly disposed in movement restricting engagement with said connector member when in said operative position, said locking assemblies destructively detachable from said connector member upon separation of a corresponding attachment member from said base, a display field disposed on an exposed exterior of said security tag assembly, said display field comprising predetermined merchandise data, a detachment assembly removably connectable to said security tag assembly and structured to detach said base and a corresponding one of said attachment members out of said operative position, said detachment assembly further comprising an activity display connected thereto and structured to indicate current operative activity of said detachment assembly, a data registering processor cooperatively structured with said detachment assembly to establish two-way communication therebetween, and said data registering processor further structured to process said merchandise data received from said detachment assembly and facilitate actuation of said detachment assembly for disposition of said security tag assembly out of said operative position.

17. A security system as recited in claim 16 wherein said detachment assembly comprises a reader assembly structured to read said merchandise data and facilitate communication thereof to said data processing register.

18. A security system as recited in claim 17 wherein said detachment assembly comprises a holding assembly structured to stabilize said security tag assembly relative to said detachment assembly to facilitate disengagement of said base and said attachment member.

19. A security system as recited in claim 18 wherein said holding assembly is communicative with said data registering processor and is activated into a release position by signaling from said data registering processor.

20. A security system as recited in claim 16 wherein said activity display comprises a plurality of visual indicators each structured and disposed to indicate a different one of a plurality of operative activities of said detachment assembly.

21. A security system as recited in claim 20 wherein said plurality of operative activities at least comprise stabilizing said security tag assembly; reading of said merchandise data and communication thereof to said data registering processor; receipt and processing of said merchandise data by said data registering processor and release of said security tag assembly from said detachment assembly.

* * * * *